(12) United States Patent
Fenderson et al.

(10) Patent No.: US 11,001,761 B2
(45) Date of Patent: May 11, 2021

(54) METHOD AND COMPOSITION FOR TREATING TAILINGS

(71) Applicant: Kemira Oyj, Helsinki (FI)

(72) Inventors: Thomas Fenderson, Decatur, GA (US); Lasse Kyllönen, Espoo (FI); Alistair King, Helsinki (FI); Evangelos Sklavounos, Helsinki (FI); Frances Fournier, Marietta, GA (US); Sukhjit Aujla, The Woodlands, TX (US)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 16/345,748

(22) PCT Filed: Dec. 7, 2017

(86) PCT No.: PCT/FI2017/050866
§ 371 (c)(1),
(2) Date: Apr. 29, 2019

(87) PCT Pub. No.: WO2018/104585
PCT Pub. Date: Jun. 14, 2018

(65) Prior Publication Data
US 2019/0284478 A1 Sep. 19, 2019

Related U.S. Application Data

(60) Provisional application No. 62/431,630, filed on Dec. 8, 2016.

(30) Foreign Application Priority Data

Dec. 21, 2016 (FI) ...................................... 20166005

(51) Int. Cl.
| | | |
|---|---|---|
| *C10G 1/04* | (2006.01) |
| *B01D 21/00* | (2006.01) |
| *B01D 21/01* | (2006.01) |
| *B01D 21/26* | (2006.01) |
| *C08K 5/31* | (2006.01) |
| *C08L 33/26* | (2006.01) |
| *C02F 1/56* | (2006.01) |

(52) U.S. Cl.
CPC ......... *C10G 1/045* (2013.01); *B01D 21/0012* (2013.01); *B01D 21/01* (2013.01); *B01D 21/26* (2013.01); *C02F 1/56* (2013.01); *C08K 5/31* (2013.01); *C08L 33/26* (2013.01); *C10G 2300/1033* (2013.01); *C10G 2300/80* (2013.01)

(58) Field of Classification Search
CPC ..... C02F 1/52; C02F 1/56; C10G 1/04; C10G 1/045
See application file for complete search history.

(56) References Cited

U.S. PATENT DOCUMENTS

| | | | | |
|---|---|---|---|---|
| 4,452,692 A | * | 6/1984 | Kneissl ................. | C10G 47/02 208/108 |
| 4,765,885 A | * | 8/1988 | Sadeghi ................. | C10G 1/04 208/390 |
| 6,019,888 A | * | 2/2000 | Mishra ................. | C10G 1/045 208/341 |
| 10,093,862 B2 | * | 10/2018 | Kyllonen ............... | C10G 1/045 |
| 2005/0194292 A1 | * | 9/2005 | Beetge ................. | C10G 33/04 208/391 |
| 2007/0021569 A1 | * | 1/2007 | Willis ................... | C08F 8/36 525/314 |
| 2011/0284428 A1 | | 11/2011 | Adeyinka et al. | |
| 2012/0048783 A1 | * | 3/2012 | Painter ................. | C10G 1/045 208/390 |
| 2012/0255886 A1 | * | 10/2012 | Flores Oropeza ..... | C10G 33/04 208/188 |
| 2013/0075340 A1 | | 3/2013 | Bara et al. | |
| 2014/0054200 A1 | | 2/2014 | Painter et al. | |
| 2014/0054232 A1 | * | 2/2014 | Duttlinger, Jr. .......... | C02F 1/54 210/710 |
| 2016/0362316 A1 | | 12/2016 | Bara et al. | |

FOREIGN PATENT DOCUMENTS

CN 105176716 A 12/2015

OTHER PUBLICATIONS

Finnish Patent and Registration Office, Search Report of Finnish patent application No. 20166005, dated Jun. 2, 2017, 1 page.

* cited by examiner

*Primary Examiner* — Michelle Stein
(74) *Attorney, Agent, or Firm* — Robin L. Teskin; Baker, Donelson, Bearman, Caldwell & Berkowitz PC

(57) ABSTRACT

A method and a composition for treating tailings from a separation process are disclosed, where bitumen is separated from mineral solids. Tailings include an aqueous phase with suspended solid particulate material and residual bitumen and have a dry solids content <25 weight-%. The method includes addition of a flocculating agent including polyacrylamide to the tailings, as well as addition of an auxiliary agent including ionic liquid to tailings in conjunction with the flocculating agent. Flocs, which include solid particulate material, are formed and the formed flocs are separated from the aqueous phase. The composition in a copolymer of (meth)acrylamide and an auxiliary agent comprising ionic liquid.

12 Claims, 4 Drawing Sheets

METHOD AND COMPOSITION FOR TREATING TAILINGS

PRIORITY

This application is a U.S national application of the international application number PCT/FI2017/050866 filed on Dec. 7, 2017, and claiming priority of provisional application application 62/431,630 filed on Dec. 8, 2016 and Finnish application 20166005 filed on Dec. 21, 2016, the contents of all of which are incorporated herein by reference.

The present invention relates to a method and composition for treating tailings according to preambles of enclosed independent claims.

Oil sands, which are also known as tar sands, are mixtures of clay, sand, water, and heavy hydrocarbons, such as bitumen. They provide a potential source of hydrocarbons for petrochemical industry. However, the known processes for separating and recovering hydrocarbons from oil sands are expensive, complicated and produce significant environmental damage. The conventional bitumen extraction methods use hot water and caustic soda to separate bitumen from sand and clay in a froth-flotation process. Tailings from the flotation process comprise water, particulate solids, such as clay, residual bitumen and natural surfactants. The result is an aqueous caustic mud-like mixture, which may still contain a significant concentration of toxic hydrocarbons and trace elements, such as arsenic. These hazardous oil sand tailings cannot be piled, especially when the solids content of the tailings is low. In general tailings are difficult to transport, treat or store in a safe and environmentally sustainable manner. Similar problems may also be related to tailings originating from the recovery of oil from oil shale.

Polymeric flocculants have been used for chemical treatment of difficult tailings, such as oil sand tailings, in order to dewater the tailings. Even if good results may be obtained by using polymeric flocculants, especially ultrafine solid particles having particle size less than 2 μm are difficult to separate and remain suspended in the water phase. The water phase which contains ultrafine solid particles cannot be recirculated back to previous process stages, because the ultrafine solid particles may start to accumulate in the water phase and disturb the bitumen extraction. Inorganic coagulants, such as gypsum or aluminium sulphate, have been used for improving separation of ultrafine solid particles. However there exists a need for an improved method to treat difficult tailings, as the reduced possibilities for water recycling make the process water intensive and environmentally unfriendly.

An object of this invention is to minimise or even totally eliminate the disadvantages existing in the prior art.

Another object of the present invention is to provide an inexpensive, simple method for treating tailings, especially oil sand tailings, and for separating liquid aqueous phase from solid particulate material.

A further object of the present invention is to provide a method and composition which would be effective and environmentally feasible.

A yet further object of the present invention is to provide a method, which is easy to scale up into industrial scale.

BRIEF DESCRIPTION OF THE SEVERAL VIEWS OF THE DRAWINGS

FIG. 1(a) shows supernatant solids and FIG. 1(b) shows settling rates for each dosage of ionic liquid.

FIG. 2(a) shows supernatant solids and FIG. 2(b) shows settling rates for each dosage of Ch-Iso co-administered with increasing dosages of polyacrylamide 1.

FIG. 3(a), FIG. 3(b), FIG. 3(c), and FIG. 3(d) show settling curves for each dosage of Ch-Iso co-administered with polyacrylamide 1 at dosages of 84 g/t, 105 g/t, 125 g/t, and 188 g/t, respectively.

Figure 1:
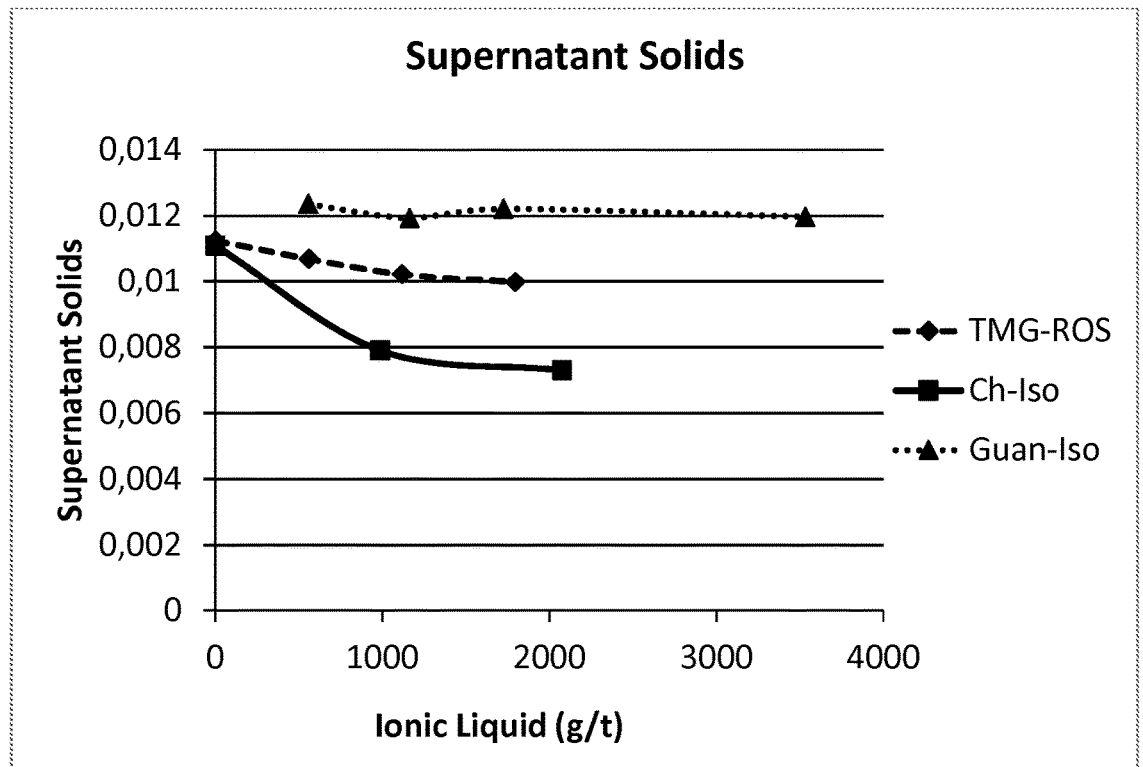
FIG. 1(a-b) provides exemplary graphs of total suspended solids (supernatant solids) and rates of flocculant settlement (settling rate) of process tailings samples that were treated with ionic liquids (TMG-ROS, Ch-Iso, or Guan-Iso) and polyacrylamide 2 according to Flocculation Experiment Procedure for Comparison of Different Ionic Liquids.
Figure 1:
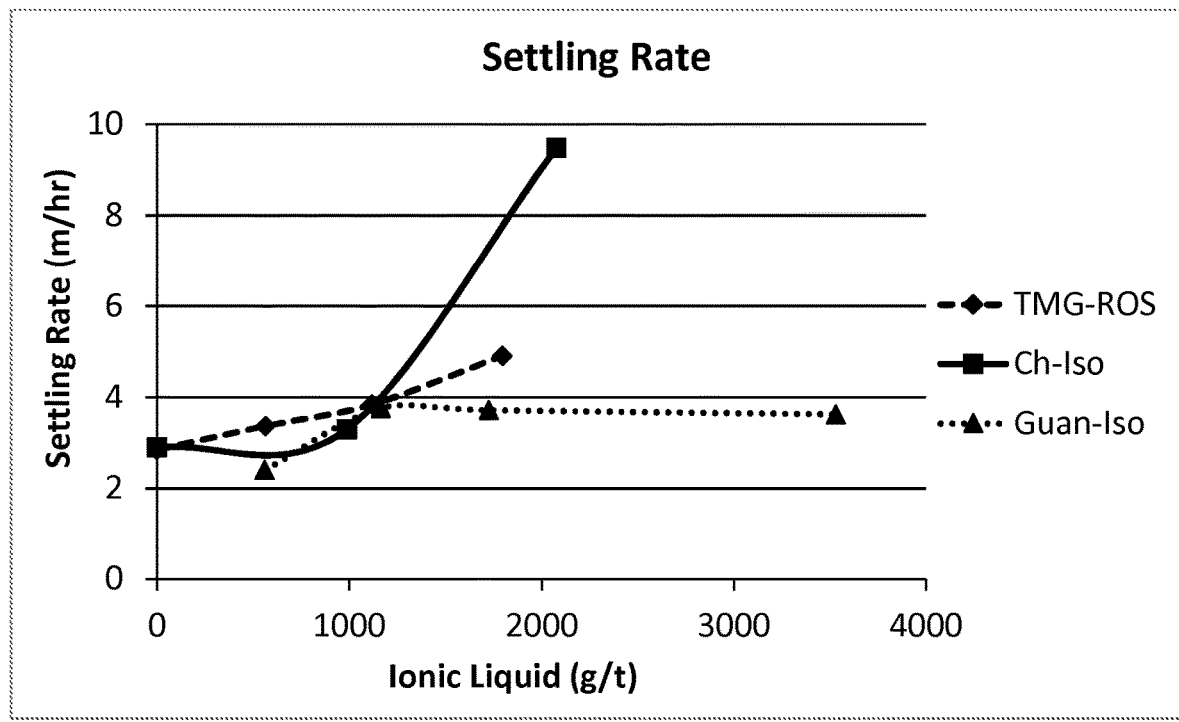

The invention is defined in the characterising parts of the enclosed independent claims. Some preferable embodiments of the invention are defined in the dependent claims. All described features apply both for the use as well as the method and composition of the invention, whenever applicable, even if it not necessarily stated so.

In typical method according to the present invention for treating tailings from a separation process, where bitumen is separated from mineral solids, the tailings comprising an aqueous phase with suspended solid particulate material and residual bitumen, the tailings having a dry solids content <25 weight-%, the method comprises
- adding a flocculating agent comprising polyacrylamide to the tailings,
- adding an auxiliary agent comprising ionic liquid to tailings in conjunction with the flocculating agent,
- allowing flocs, which comprise solid particulate material, to form, and
- allowing the formed flocs to separate from aqueous phase.

Typical composition according to the invention for treating tailings comprises a copolymer of (meth)acrylamide and an auxiliary agent comprising ionic liquid.

Typical use of ionic liquid according to the present invention is for treating oil sand tailings together with flocculating agent comprising polyacrylamide.

Now it has been surprisingly found out that use of an auxiliary agent comprising ionic liquid together with polyacrylamide flocculating agent effectively removes solid particulate material from the aqueous phase as well as improves the separation of the formed flocs. When using auxiliary agent, which comprises ionic liquid, it is possible to reduce the amount of used polymer while obtaining the same treatment results.

The auxiliary agent comprises ionic liquid and optionally a solvent, for example an organic solvent, such as kerosene or the like.

According to another embodiment the auxiliary agent is free of organic solvents.

The term "ionic liquid" is in the present context understood to be an ionic salt-like material, which is liquid at temperature of <100° C. at atmospheric pressure of 101.3 kPa. Ionic liquids include two components, namely a cation component and an anion component. The ionic liquids which are especially suitable for use in the present invention have a negligible vapour pressure at room temperature, typically about $10^{-10}$ Pa, but they can be converted into form, which has vapour pressure >0.01 Pa, preferably >0.1 Pa, at 130° C. The ionic liquids are soluble in water and insoluble in non-polar organic solvents. According to one embodiment the auxiliary agent consists of ionic liquid.

Ionic liquids are non-flammable and thermally stable, which makes the auxiliary agent safe to handle and transport and minimizes the occupational hazards during its use.

The ionic liquid used in the auxiliary agent is also preferably biodegradable. In this context compounds and compositions are referred biodegradable if they reach a biodegradation level higher than 60%, evaluation being based on the so-called BOD5 (Biochemical oxygen demand after 5 days) or "Closed Bottle Test" (OECD 301 D).

The auxiliary agent comprises preferably at least one ionic liquid prepared from an unsubsituted or substituted primary, secondary or tertiary amine, such as tributylamine; or from an unsubstituted or substituted pyridine, amidine or guanidine, preferably together with a fatty acid or rosin acid. According to one preferable embodiment of the present invention the ionic liquid is prepared from substituted tertiary amine which is choline or from substituted guanidine, which is tetramethylguanidine (TMG). According to one embodiment the substituted guanidine is 1,1,2,3,3,-pentamethylguanidine (PMG) or 2-butyl-1,1,3,3-tetramethyl guanidine (BTMG).

The auxiliary agent may comprise also at least one fatty and/or resin acid. According to one embodiment of the invention the auxiliary agent comprises a mixture of fatty acids and/or resin acids. Suitable fatty acids may be saturated or unsaturated, and they can be branched or linear. Examples of suitable fatty acids are stearic acid, hexanoic acid and isostearic acid. According to one preferable embodiment of the invention the fatty acid is selected from stearic acid or isostearic acid. By proper selection of fatty and/or resin acids the properties of the auxiliary agent may be tailored to provide optimal interaction with the flocculating agent, which comprises polyacrylamide. According to one preferable embodiment of the invention the resin acid is rosin acid.

According to one preferable embodiment the auxiliary agent comprises ionic liquid, which is selected from choline isostearate or tetramethylguanidine rosinate.

The flocculating agent may be added in such amount that the concentration of polyacrylamide in the tailings is 70-90, preferably 80-160, more preferably 90-120, given as g polymer/ton tailings.

In the present context "polyacrylamide" denotes a copolymer of methacrylamide or acrylamide and cationic, anionic and/or non-ionic monomers, preferably a copolymer of methacrylamide or acrylamide and cationic or anionic monomers, more preferably a copolymer of acrylamide and cationic or anionic monomers.

According to one embodiment of the invention the flocculating agent comprises a cationic polyacrylamide. Cationic polyacrylamide is a copolymer of (meth)acrylamide and at least one cationic monomer, preferably a copolymer of acrylamide and at least one cationic monomer. The cationic monomer may be selected from 2-(dimethylamino) ethyl acrylate (ADAM), [2-(acryloyloxy)ethyl] trimethylammonium chloride (ADAM-Cl), 2-dimethylaminoethyl methacrylate (MADAM), [2-(methacryloyloxy)ethyl] trimethylammonium chloride (MADAM-Cl), [3-(acryloylamino)propyl] trimethylammonium chloride (APTAC), [3-(methacryloylamino)propyl] trimethylammonium chloride (MAPTAC), or any combinations thereof. According to an embodiment of the invention, the polyacrylamide originates from 15-40 mol-%, preferably 20-35 mol-% of cationic monomers, calculated from total amount of monomers used in polymerisation.

According to another embodiment of the invention the flocculating agent comprises an anionic polyacrylamide. Anionic polyacrylamide is a copolymer of (meth)acrylamide and at least one anionic monomer. The anionic monomer may be selected from unsaturated mono- or dicarboxylic acids, such as acrylic acid, maleic acid, fumaric acid, itaconic acid, aconitic acid, mesaconic acid, citraconic acid, crotonic acid, isocrotonic acid, angelic acid or tiglic acid.

In the present method also a flocculating agent comprising polyacrylamide is added to the tailings. The flocculating agent may be added to the tailings simultaneously but separately with the auxiliary agent, which comprises ionic liquid. Alternatively the flocculating agent may be added before or after the auxiliary agent.

An auxiliary agent comprising ionic liquid is added to the tailings in conjunction with the flocculating agent. As explained above, this means that the auxiliary agent may be added before or after the addition of the flocculating agent, or it may me added simultaneously, but separately, with the flocculating agent. According to one preferable embodiment the auxiliary agent is added before the flocculating agent.

According to one embodiment of the invention the flocculating agent and the auxiliary agent are mixed together to form a composition in liquid form that can be added to the tailings.

According to one embodiment the auxiliary agent may be added in such amount that the concentration of ionic liquid in the tailings is 500-3000, preferably 1000-2500, more preferably 1200-2200, given as g active substance/ton tailings.

The auxiliary agent may also comprise a plurality of, i.e. two or more, different ionic liquids.

After addition of the flocculating agent and the auxiliary agent flocs, which comprise solid particulate material, are allowed to form. The synergetic effect produced by the flocculating agent and the auxiliary agent provides effective formation of flocs comprising also fine solid particulate material. Furthermore, the formed flocs settle relatively fast, which makes their separation effective also by using conventional settling arrangements, such as gravity settlers. The aqueous phase, after it is separated from the formed flocs, may comprises less than 2 weight-%, preferably less than 1.5 weight-%, more preferably less than 1 weight-%, of fine solid particulate material having diameter less than 2 µm. Preferably the aqueous phase, after separation of flocs, is free of solid particulate material having diameter >2 µm.

The formed flocs may be separated from the aqueous phase by settling, centrifugation, filtration, thin lift dewatering or with any suitable separation technique. According to one preferable embodiment a settled floc phase is obtained, which floc phase has a solids content of at least 30 weight-%, preferably at least 40 weight-%, more preferably at least 45 weight-%. Due to the high solids content the floc phase is easy to handle, requires less space when stored and is more convenient to pile.

In one embodiment the ionic liquid may be separated from floc phase, if desired, regenerated and recycled back in preceding steps in the treating process.

The separated aqueous phase may be recycled back to the separation process, where bitumen is separated from mineral solids. The invention achieves a clean aqueous phase that can be used in the original separation process from where the tailings originate or it may be used in some other associated process. Alternatively the aqueous phase may be returned to the surroundings, after optional further water treatment steps.

Tailings, which are treated with the present invention, originate from a separation process, where bitumen is separated from mineral solids. Tailings may originate from a separation process involving oil sand, oil shale, oil contaminated sand or oil contaminated earth or sand containing crude oil. Preferable tailings are oil sand tailings. The tailings may have a dry solids content <25 weight-%, preferably <20 weight-%, more preferably <15 weight-%. According to one embodiment the dry solids content of the tailings may be in a range of 5-25 weight-%, preferably 7-20 weight-%, more preferably 7-15 weight-%. Tailings may comprise solid mineral particles, such as clay and/or sand, having particle size <45 µm, preferably <30 µm, more preferably <15 µm, sometimes even <5 µm.

Tailings may comprise also residual bitumen. In the present context the term "bitumen" is understood as a highly viscous mixture of crude oil, comprising hydrocarbons heavier than pentanes, and which mixture has a viscosity above 10 000 cP, and is non-mobile at reservoir conditions. Bitumen may have an API gravity <12°, preferably <10°, more preferably <8°. The API gravity of bitumen may be in the range of 12°-6°. Bitumen may comprise >15 weight-%, preferably >25 weight-%, of asphaltenes. The total amount of asphaltenes and resins in bitumen may be >40 weight-%, preferably >45 weight-%. Tailings may comprise <5 weight-%, preferably <2 weight-%, more preferably <1 weight-%, of bitumen, before addition of the flocculating and/or auxiliary agent.

EXPERIMENTAL Some embodiments of the invention are described in the following non-limiting examples.

Following materials were used in experimental studies:

Ionic Liquids

Choline Isosterate (Ch-Iso): active content 51.3%
Tetramethylguanidine rosinate (TMG ROS): active content 27.3%
Guanidinium isostearate (Guan-Iso): active content 10.0%

Polymer Flocculants

Polyacrylamide 1: standard viscosity 3.5 cP, charge 30%
Polyacrylamide 2: standard viscosity 4.0 cP, charge 30%

Process Samples

The tailings used for the experiments were thickener feed samples from an industrial process. The tailings contained approximately 11-13% solids and less than 1% bitumen.

The water used for polymer dilution was industrial gland water, and it was used to prepare polymer solutions at a concentration of 0.4%. Same water was also used to dilute the polymer solutions to 0.05% directly before their use.

Flocculation Experiment Procedure

Flocculation experiments were done according to following procedure:

1) A bucket of industrial thickener feed tailings was vigorously stirred to homogenize the tailings, and 150-170 g aliquots were transferred to 250 ml plastic beakers.
2) The tailings aliquots in beakers were stirred with a 4-blade pitched impellers for 60 sec at 400 rpm prior to chemical addition.
3) When ionic liquid was used it was added to the tailings aliquot and mixed for an additional 60 sec.
4) The chosen polymer flocculant, 0.05% solution in industrial gland water was then added to the tailings aliquot as a single injection.
5) The tailings aliquot was stirred for an additional 30 sec at 400 rpm to condition the flocs and then the impeller was stopped.
6) The tailings aliquots were transferred to a 250 ml graduated cylinder and the volume height of the settling floc bed was recorded over time.
7) After 10 minutes of settling, the final bed height was recorded and the top 60 ml of supernatant was transferred into a separate container.
8) The supernatant was stirred to homogenize and then a 25 g sample was taken and measured for solids content by drying the sample in an oven overnight at 110° C.

Comparison of Different Ionic Liquids

Figure 2:
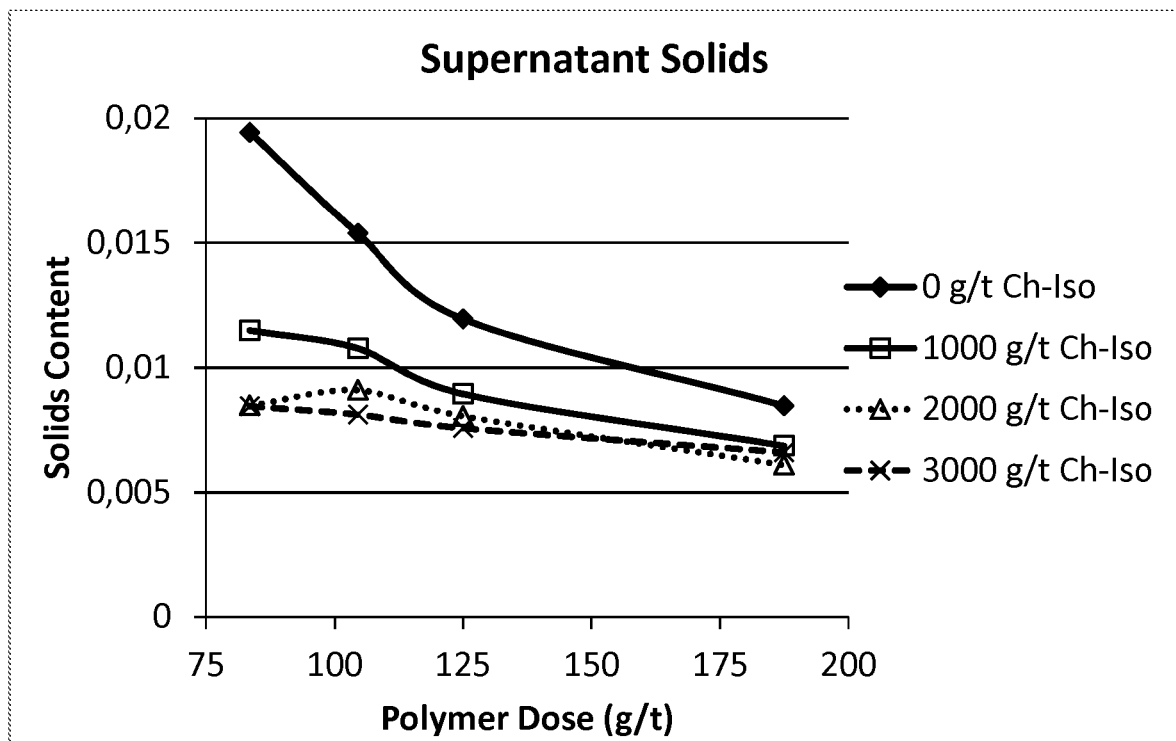
FIG. 2(a-b) provides exemplary graphs of total suspended solids (supernatant solids) and rates of flocculant settlement (settling rate) of process tailings samples that were treated with Ch-Iso (0-3000 g/t) and polyacrylamide 1 (80-190 g/t) according to Flocculation Experiment Procedure for Comparison of Different Dosage Amounts.
Figure 2:
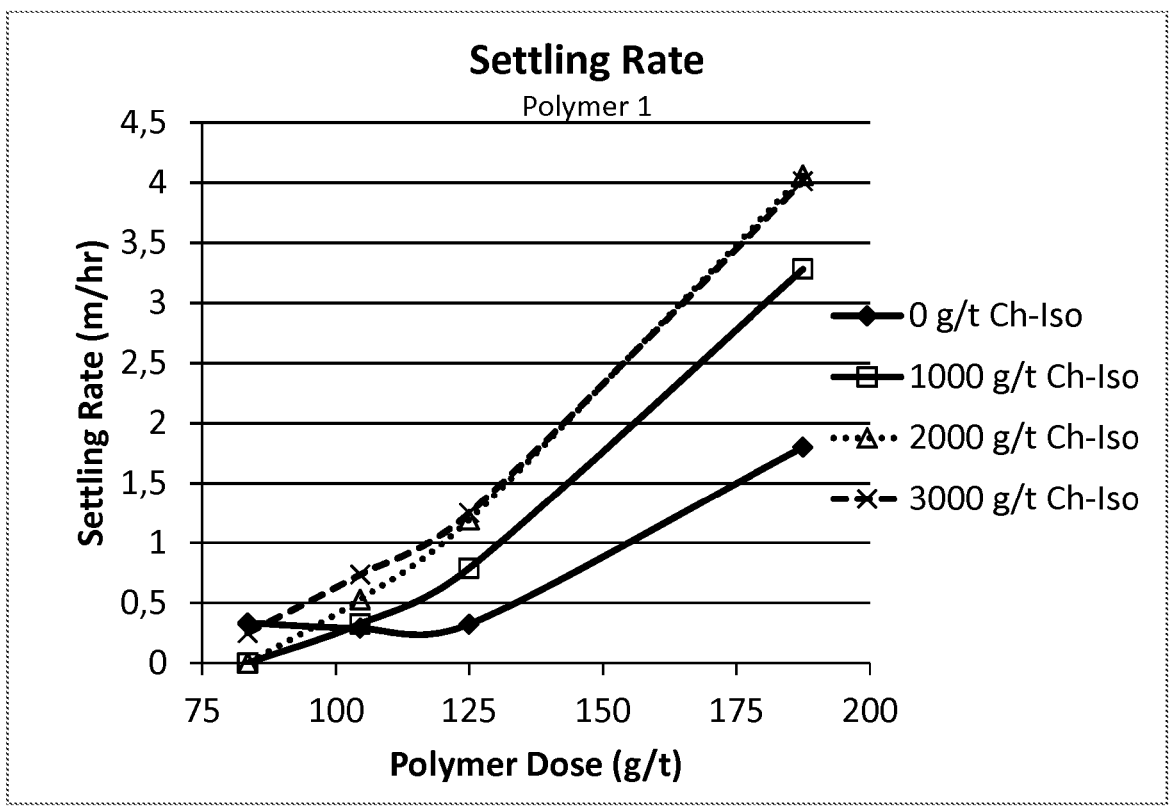
Figure 3:
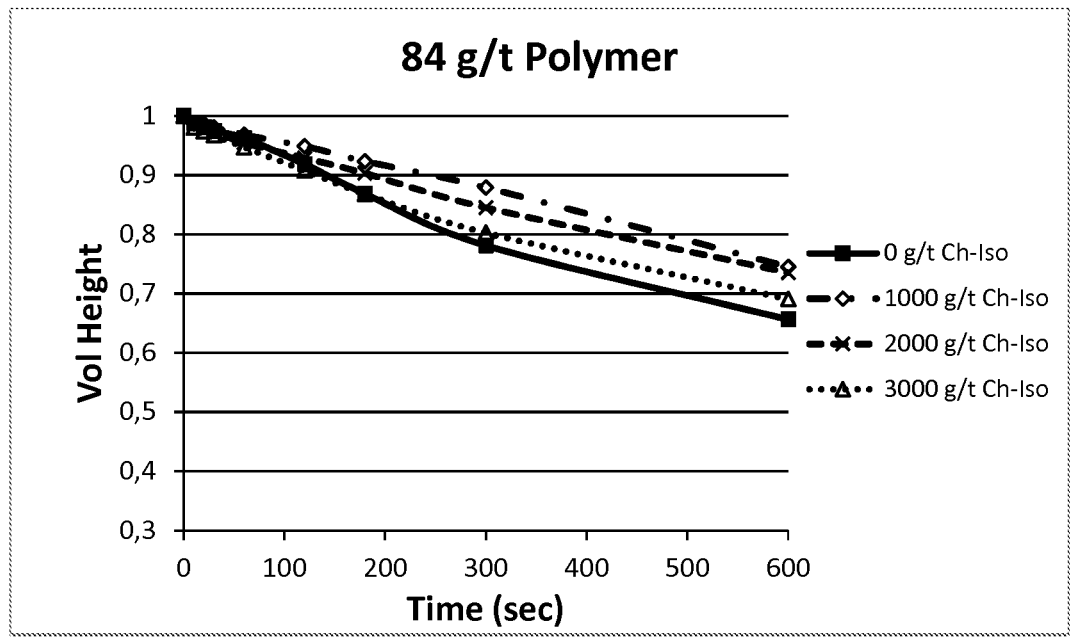
FIG. 3(a-d) provides exemplary settling curves of volume height of the settling floc bed (Vol Height) recorded over time in process tailings samples that were treated with Ch-Iso (0-3000 g/t) and polyacrylamide 1 (84-188 g/t) according to Flocculation Experiment Procedure for Comparison of Different Dosage Amounts.
Figure 3:
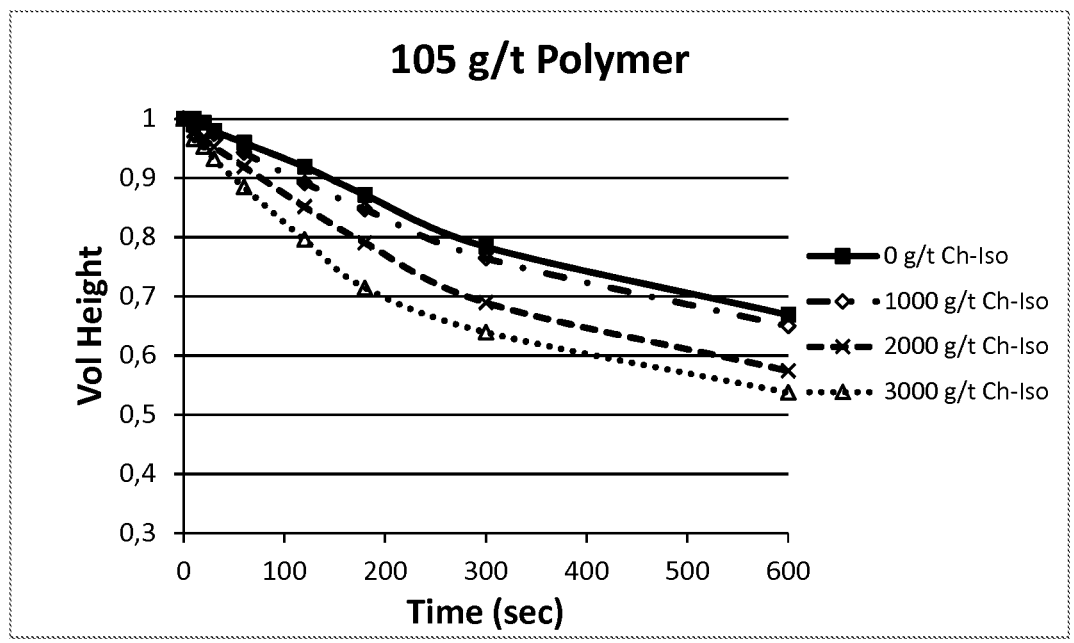
Figure 3:
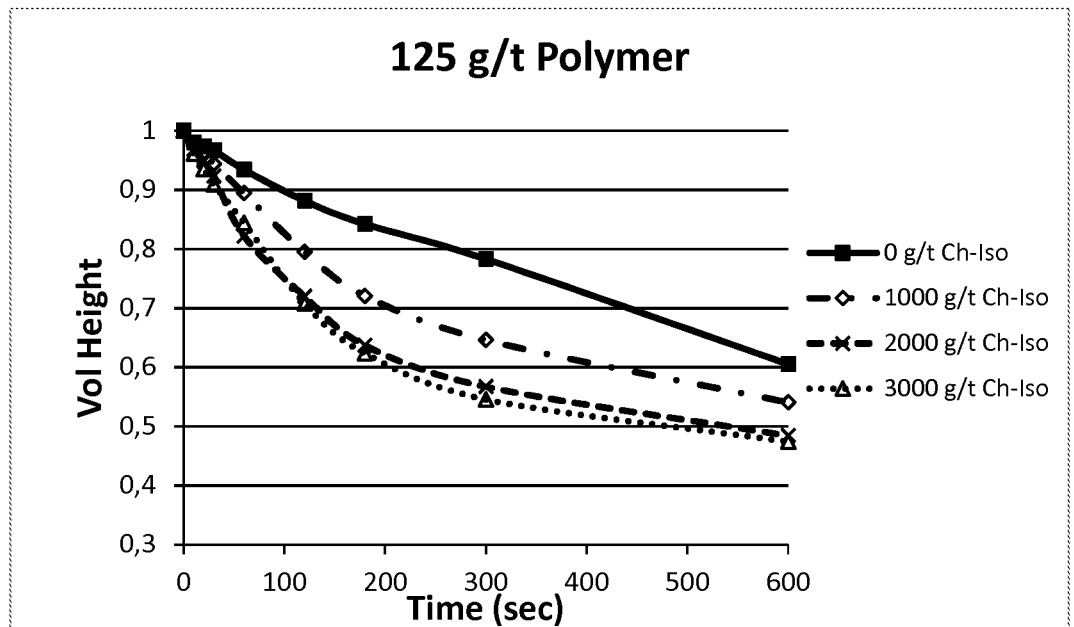
Figure 3:
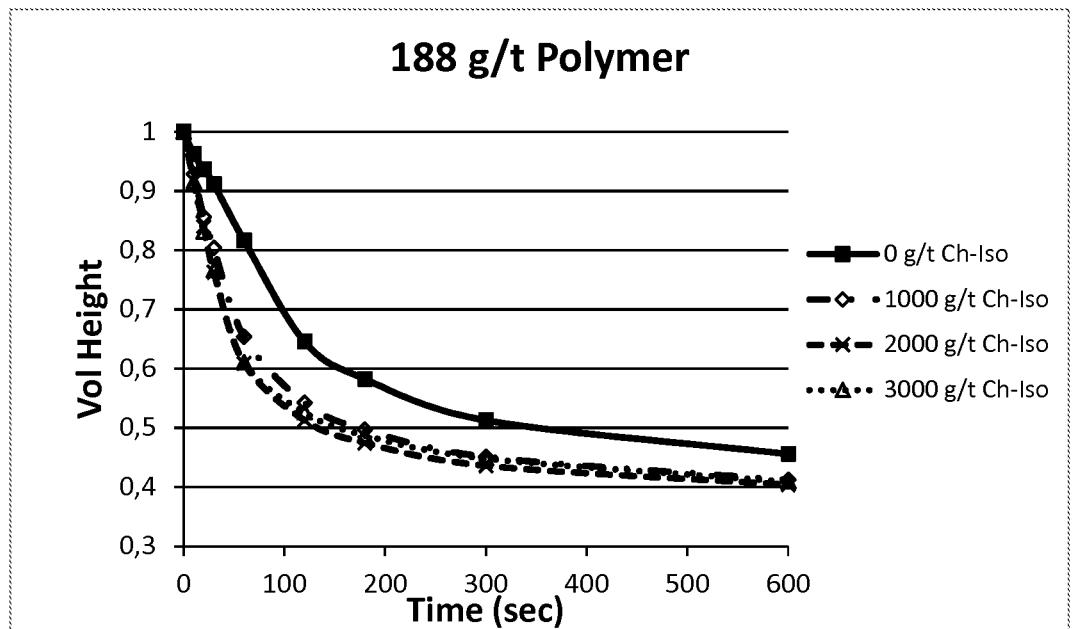

In FIGS. 1(a) and 2(a) the solids content (y-axis) is given in weight-%, and the shown numerical values of the y-axis should be multiplied with 100%. In FIG. 3(a)-(d) the y-axis values are given as %-values, and shown numerical values of the y-axis should be multiplied with 100%.

In order to determine the affinity of different ionic liquids to the tailings the results for supernatant solids are shown in FIG. 1A and results for settling rate are shown in FIG. 1B for three ionic liquids TMG-ROS, Ch-Iso and Guan-Iso. Polymer flocculant used was polymer flocculant 2.

From the figures it can be seen that the addition of Guan-Iso showed very little performance change. There was a slight but noticeable improvement with the addition of TMG-ROS, while Ch-Iso showed significant improvement in both results.

Comparison of Different Dosage Amounts

Ch-Iso was added at dosages of 0 g/t, 1000 g/t, 2000 g/t and 3000 g/t, while the flocculant polymer 1 dosage was between 80 and 190 g/t. The results the supernatant solids are shown in FIG. 2A and results for settling rates are shown in FIG. 2B at different Ch-Iso dosages. FIGS. 3A-3D show settling curves for each flocculant polymer dosage.

It can be observed that at each flocculant polymer dosage the addition of Ch-Iso improved and reduced the supernatant solids content. The settling rate was also improved at all doses other than 84 g/t. The settling curves help to demonstrate that after the ten minute settling period, the increase in settling rate was coupled with an improvement in settling volume, which may result to higher underflow densities in the thickener.

As the addition of Ch-Iso improved the thickener results at a given dosage it also means that flocculant polymer dosage could be reduced, while still meeting the desired performance criteria. For example, if a supernatant solids content of 1% was desired, without addition of Ch-Iso this would occur at an approximate flocculant polymer dosage of 160 g/t. After the addition of 1000 g/t Ch-Iso, 1% solids content could be achieved at a flocculant polymer dosage of approximately 105 g/t. This means that the reduction in polymer dosage of greater than 30% is achieved.

Although certain embodiments and examples have been described in detail above, those having ordinary skill in the art will clearly understand that many modifications are possible in the embodiments and examples without departing from the teachings thereof. All such modifications are intended to be encompassed within the below claims of the invention.

The invention claimed is:

1. A method for treating tailings from a separation process, wherein bitumen is separated from mineral solids, the tailings comprising an aqueous phase with suspended solid particulate material and residual bitumen, the tailings having a dry solids content <25 weight-%, the method comprising:
   adding a flocculating agent comprising polyacrylamide to the tailings,
   adding an auxiliary agent comprising ionic liquid to tailings in conjunction with the flocculating agent, wherein the ionic liquid is prepared by combining an unsubstituted or substituted pyridine, amidine, choline or guanidine, and a fatty acid selected from stearic acid, isostearic acid and rosin acid,
   allowing flocs, which comprise solid particulate material, to form, and allowing the formed flocs to separate from the aqueous phase.

2. The method according to claim 1, wherein the auxiliary agent is added in such amount, that the concentration of ionic liquid in the tailings is 500-3000, 1000-2500, or 1200-2200, given as g active substance/ton tailings.

3. The method according to claim 1, wherein the ionic liquid is selected from choline isostearate or tetramethylguanidine rosinate.

4. The method according to claim 1, wherein the flocculating agent comprises a cationic polyacrylamide.

5. The method according to claim 1, wherein the flocculating agent comprises an anionic polyacrylamide.

6. The method according to claim 1, wherein the flocculating agent is added, in such amount that the concentration of polyacrylamide is 70-90, 80-160, or 90-120, given as g/ton tailings.

7. The method according to claim 1, wherein the aqueous phase after separation of formed flocs comprises less than 2 weight-%, less than 1.5 weight-%, or less than 1 weight-%, of fine solid particulate material having diameter less than 2 µin.

8. The method according to claim 1, further comprising obtaining a settled floc phase with solids content of at least 30 weight-%, at least 40 weight-%, or at least 45 weight-%.

9. The method according to claim 1, further comprising recycling the separated aqueous phase to the separation process, where bitumen is separated from mineral solids.

10. The method according to claim 1, wherein the auxiliary agent is added before the flocculating agent.

11. The method according to claim 1, further comprising separating the formed flocs from the aqueous phase by settling, centrifugation, filtration or thin lift dewatering.

12. The method of claim 1, wherein the combined treatment of the tailings with the ionic liquid and the polyacrylamide flocculating agent permits the dosage of the polyacrylamide flocculant to be reduced by at least 30% while achieving the same solids content reduction compared to treatment of the tailings with the polyacrylamide flocculating agent in the absence of said ionic liquid.

* * * * *